US008661341B1

(12) United States Patent
van Dijk (10) Patent No.: US 8,661,341 B1
(45) Date of Patent: Feb. 25, 2014

(54) SIMHASH BASED SPELL CORRECTION

(75) Inventor: Luuk van Dijk, Zurich (CH)

(73) Assignee: Google, Inc., Mountain View, CA (US)

( * ) Notice: Subject to any disclaimer, the term of this patent is extended or adjusted under 35 U.S.C. 154(b) by 235 days.

(21) Appl. No.: 13/009,189

(22) Filed: Jan. 19, 2011

(51) Int. Cl.
*G06F 17/00* (2006.01)

(52) U.S. Cl.
USPC .......................................... 715/257; 715/256

(58) Field of Classification Search
USPC ........................................ 715/200, 256, 257
See application file for complete search history.

(56) References Cited

U.S. PATENT DOCUMENTS

| | | | | |
|---|---|---|---|---|
| 4,780,816 | A * | 10/1988 | Connell | 711/216 |
| 5,297,038 | A * | 3/1994 | Saito | 1/1 |
| 6,738,779 | B1 * | 5/2004 | Shapira | 707/747 |
| 7,158,961 | B1 | 1/2007 | Charikar | |
| 7,376,752 | B1 * | 5/2008 | Chudnovsky et al. | 709/245 |
| 7,503,000 | B1 * | 3/2009 | Kreulen et al. | 715/259 |
| 7,574,409 | B2 * | 8/2009 | Patinkin | 706/12 |
| 7,610,283 | B2 | 10/2009 | Arasu et al. | |
| 7,809,722 | B2 | 10/2010 | Gokturk et al. | |
| 7,812,241 | B2 | 10/2010 | Ellis | |
| 7,849,399 | B2 * | 12/2010 | Hoffmann | 715/229 |
| 8,032,529 | B2 * | 10/2011 | Gupta et al. | 707/736 |
| 8,370,384 | B2 * | 2/2013 | Ookuma | 707/769 |
| 2002/0059343 | A1 * | 5/2002 | Kurishima et al. | 707/512 |
| 2003/0110163 | A1 | 6/2003 | Chen et al. | |
| 2003/0120647 | A1 * | 6/2003 | Aiken et al. | 707/3 |
| 2006/0013450 | A1 | 1/2006 | Shan et al. | |
| 2007/0005556 | A1 | 1/2007 | Ganti et al. | |
| 2007/0168182 | A1 * | 7/2007 | Abe | 704/10 |
| 2007/0204344 | A1 * | 8/2007 | Xue | 726/24 |
| 2007/0239705 | A1 * | 10/2007 | Hunt et al. | 707/5 |
| 2008/0028468 | A1 * | 1/2008 | Yi et al. | 726/23 |
| 2008/0059876 | A1 * | 3/2008 | Hantler et al. | 715/257 |
| 2008/0155398 | A1 * | 6/2008 | Bodin et al. | 715/257 |
| 2008/0162474 | A1 | 7/2008 | Thong et al. | |
| 2008/0205774 | A1 | 8/2008 | Brinker et al. | |
| 2008/0249764 | A1 * | 10/2008 | Huang et al. | 704/9 |

(Continued)

OTHER PUBLICATIONS

Kann et al., Implementation Aspects and Applications of a Spelling Correction Algorithm, Google 1998, pp. 1-18.*

(Continued)

*Primary Examiner* — Cong-Lac Huynh
(74) *Attorney, Agent, or Firm* — Wolff & Samson PC

(57) ABSTRACT

Methods, systems, and apparatus for performing simhash based spell correction are provided. A character string is simhashed to generate a simhashed character string. A plurality of substrings is extracted from the character string by applying a sliding window of at least two characters to the character string. The plurality of substrings are hashed to produce a plurality of corresponding hash values. Each hash value is processed to generate a simhashed character string. The simhashed character string is then compared with character strings within a simhashed dictionary dataset to determine at least one candidate to replace the character string. Processing each hash value includes extracting a set of lowest bits from each hash value, and mapping each set of lowest bits to the bitmask.

16 Claims, 5 Drawing Sheets

(56) References Cited

U.S. PATENT DOCUMENTS

| | | | |
|---|---|---|---|
| 2009/0024826 A1* | 1/2009 | Zhang et al. | 711/216 |
| 2009/0150371 A1* | 6/2009 | Dasdan et al. | 707/5 |
| 2009/0172523 A1* | 7/2009 | Colby | 715/257 |
| 2010/0010671 A1 | 1/2010 | Miyamoto | |
| 2010/0070509 A1 | 3/2010 | Li et al. | |
| 2010/0077015 A1 | 3/2010 | Eshghi et al. | |
| 2010/0254615 A1* | 10/2010 | Kantor et al. | 382/218 |
| 2010/0299731 A1* | 11/2010 | Atkinson | 726/6 |
| 2011/0093426 A1* | 4/2011 | Hoglund | 706/52 |
| 2012/0016897 A1* | 1/2012 | Tulumbas et al. | 707/759 |
| 2012/0051657 A1* | 3/2012 | Lamanna et al. | 382/218 |
| 2012/0124566 A1* | 5/2012 | Federighi et al. | 717/164 |
| 2012/0136650 A1* | 5/2012 | Udupa et al. | 704/9 |
| 2012/0166942 A1* | 6/2012 | Ramerth et al. | 715/257 |
| 2012/0215853 A1* | 8/2012 | Sundaram et al. | 709/206 |

OTHER PUBLICATIONS

Jain, A Comparison of Hashing Schemes for Address Lookup in Computer Networks, IEEE 1992, pp. 1570-1573.*

Liu et al., Large Scale Hamming Distance Query Processing, IEEE 2011, pp. 553-564.*

Narayana et al. Near-Duplicate Web Page Detection: A Comparative Study of Two Contrary Approaches, IEEE 2011, pp. 1-8.*

Pearson, Fast Hashing of Variable-Length Text Strings, ACM 1990, pp. 667-680.*

Dodds, Reducing Dictionary Size by Using a Hashing Technique, ACM 1982, pp. 368-370.*

* cited by examiner

SIMHASH BASED SPELL CORRECTION

FIELD OF THE INVENTION

The present invention is generally directed to automatic spell correction.

BACKGROUND

Traditional spell correction systems require user input of an entire word or string before attempting to determine if the inputted word or string is spelled correctly. This determination requires considering that each word entered by a user is potentially misspelled.

Traditional spell correction systems may also use misspelling edit probabilities to determine if a word is misspelled. For example, determining that an 'e' and an 'r' are more likely to be substitutes for each other than an 'h' and an 'a' due to the relative proximity of 'e' and 'r' on most keyboards.

However, the aforementioned systems require time consuming and resource intensive processing, as well as possibly requiring input of an entire word before spell correction takes place. This requires that a user type in an entire word and then wait for a selection of possible corrections.

SUMMARY OF THE INVENTION

An alternative spell correction system and method, based on a simhashed dictionary dataset, can provide efficient and accurate spell correction of words in real time. Specifically, as a character of a word is inserted, deleted, or substituted, spell correction takes place through referencing a simhashed dictionary dataset to find character strings with a high probability for replacing or completing the word and presenting these character strings to a user as possible candidates for completing the word.

In accordance with an embodiment, a character string is simhashed to generate a simhashed character string. A plurality of substrings is extracted from the character string by applying a sliding window of at least two characters to the character string. The plurality of substrings are hashed to produce a plurality of corresponding hash values. Each hash value is processed to generate a simhashed character string. The simhashed character string is then compared with character strings within a simhashed dictionary dataset to determine at least one candidate to replace the character string. Processing each hash value includes extracting a set of lowest bits from each hash value, and mapping each set of lowest bits to a bitmask representing the simhashed character string.

In accordance with an embodiment, comparing the simhashed character string with character strings within a simhashed dictionary may be performed by applying a nearest neighbor algorithm to search the simhashed dictionary dataset for the at least one candidate. Applying the nearest neighbor algorithm includes determining a hamming distance between the simhashed character string and each character string within the simhashed dictionary dataset satisfying a threshold, scoring each character string within the simhashed dictionary dataset satisfying the threshold, and ranking the scored character strings.

In accordance with an embodiment, the at least one candidate may be presented for selection to replace the character string.

In accordance with an embodiment, one of the at least one candidates may automatically replace the character string.

In accordance with an embodiment, a starting anchor and an ending anchor are appended to the character string.

In accordance with an embodiment, a simhashed dictionary dataset is generated. A starting anchor and an ending anchor are appended to each character string within a dictionary dataset to form corresponding composite character strings. Substrings from each composite character string are extracted by applying a sliding window of at least two characters to the composite character string. Each extracted substring is hashed to produce a corresponding hash value. A set of lowest bits is extracted from each hash value. A bitmask corresponding to each character string is generated by mapping each set of lowest bits to the bitmask.

In accordance with an embodiment, a system for facilitating simhash based spell correction includes means for simhashing a character string to generate a simhashed character string. The system includes means for extracting a plurality of substrings from a character string by applying a sliding window of at least two characters to the character string, means for hashing the plurality of substrings to produce a plurality of corresponding hash values, means for processing each hash value to generate a bitmask representing a simhashed character string, and means for comparing the simhashed character string with character strings within a simhashed dictionary dataset to determine at least one candidate to replace the character string.

The system additionally includes means for performing all other steps described above.

These and other advantages of the invention will be apparent to those of ordinary skill in the art by reference to the following detailed description and the accompanying drawings.

DETAILED DESCRIPTION

An alternative spell correction system and method, based on a simhashed dictionary dataset, can provide efficient and accurate spell correction of words in real time. Specifically, as a character of a word is inserted, deleted, or substituted, spell correction takes place through referencing a simhashed dictionary dataset to find character strings with a high probability for replacing or completing the word and presenting these character strings to a user as possible candidates for completing the word.

Figure 1:
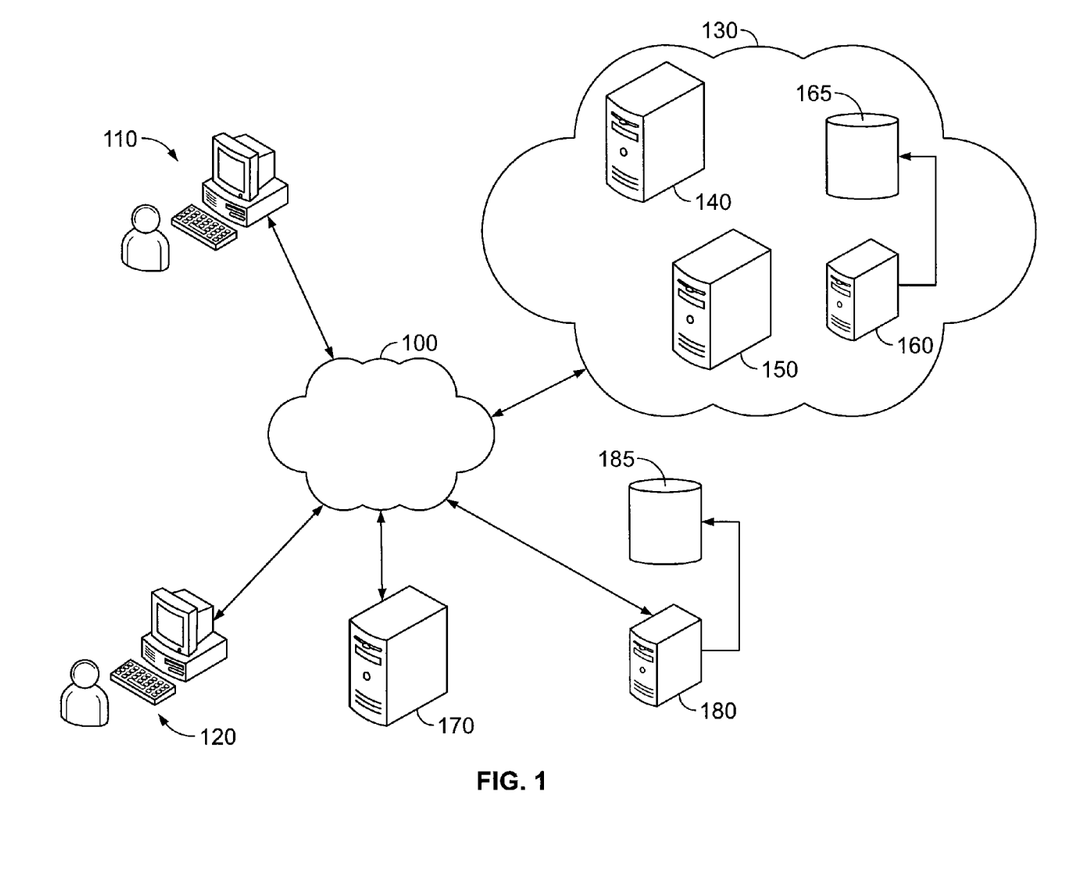
FIG. 1 is a diagram showing a cloud computing environment that may be used for implementing simhash based spell correction.

Simhash based spell correction, as described herein, can be provided and accessed in a variety of forms. FIG. 1 illustrates an exemplary network 100 in which various exemplary embodiments of simhash based spell correction can be provided.

In one exemplary embodiment, simhash based spell correction can be provided through a cloud computing environment 130. As illustrated, users at personal computers, such as computer 110 and computer 120 could use simhash based spell correction provided by cloud 130 via network 100. Within the cloud 130, servers 140, 150, and/or 160 can provide the simhash based spell correction. For example, server 140 may provide a web-enabled application implementing the simhashed based spell correction, such as a search engine. A dictionary of simhashed words can be stored in database 165 accessed via a database server 160, and access to the web-enabled application or search engine can be provided via a web-page at server 150. A web-based implementation of simhash based spell correction can be created using standard technologies.

In a further embodiment, a specific server (e.g. server 170 or server 180) can host a network application providing simhash based spell correction that is accessible by computers 110 and 120. In accordance with this embodiment, the network application can be accessed via the Internet or as a standalone network application (e.g., an application provided within a company intranet). In an intranet environment, a server 170 hosting the network-based simhash based spell correction application can access the dictionary of simhashed words from a server 180, which is connected to a database 185.

A simhash (similarity hash) or locality-sensitive hash represents hash functions useful for determining the degree of similarity between elements. For example, each element within a group is hashed and similar items resulting from the hash may be mapped to the same buckets with a high probability. More specifically, a simhash function maps elements in a domain where a metric between elements within that domain are defined. Elements of the domain may be mapped to sets, and one or more elements of each set are used as the hash value. This results in set similarity being directly proportional to the probability of the hash values being equal. For example, comparing a simhashed word and a simhashed misspelled version of the word should result in a low hamming distance between the word and the misspelled version of the word. In contrast, comparing the simhashed word to a random simhashed word would likely result in a high hamming distance. A hamming distance between two words represents the number of positions at which corresponding characters are different.

Simhashing is a permutation of a conventional hash algorithm. Applying a hash function to a character string results in completely different hash values regardless of the similarity of the character strings. Applying hash functions to character strings, such as phrases of words, for example, generally results in completely different hash values. For example, applying hash functions may be applied to the following character strings representing phrases of words: the phrase "the bat sat on the cat" results in a hash value of 20595792, the phrase "the bat sat on a cat" results in a hash value of 09212041, and the phrase "blue grits and spam" results in a hash value of "15101262." If these hash values are mapped to a bit representation, the hamming distance will be high because the initial hash values are all random and different from one another. It should be noted that all phrases and hash values described herein are exemplary.

In contrast, simhashing the same phrases discussed above results in hash values that are similar to each other, meaning that the hamming distance between the phrases is low. Simhashing in general is performed by identifying certain features corresponding to an object, in this case, words within a phrase or letters within the phrase. The features are then hashed using a hash function to produce hash values similar to those shown above, except with greater similarity. The hash values are then mapped to a bit representation of the sum of all hashed features. For example, if the three phrases above were simhashed, their corresponding simhashed bitstring representations may be:

String 1 001100101100000000111110001111110 for "the bat sat on the cat";
String 2 001100101000000000111100001111000 for "the bat sat on a cat"; and
String 3 001110101011010101110101110011000 for "blue grits and spam."

In this case, the simhashed bitstring representations of "the bat sat on the cat" and "the bat sat on a cat" are very similar, while the simhashed bitstring representation of "blue grits and spam" is not similar to the first two.

From these representations, hamming distances can also be calculated. Hamming distance measures the minimum number of substitutions required to change one string into the other, or the number of errors that transformed one string into the other. For example, the hamming distance between String 1 and String 2 above is 4 due to four bits of the bitstring representations being different between String 1 and String 2.

Before simhash based spell correction can be applied to a received or input character string set, a simhashed dictionary dataset based on a dictionary dataset of words or character strings must be generated.

Figure 2:
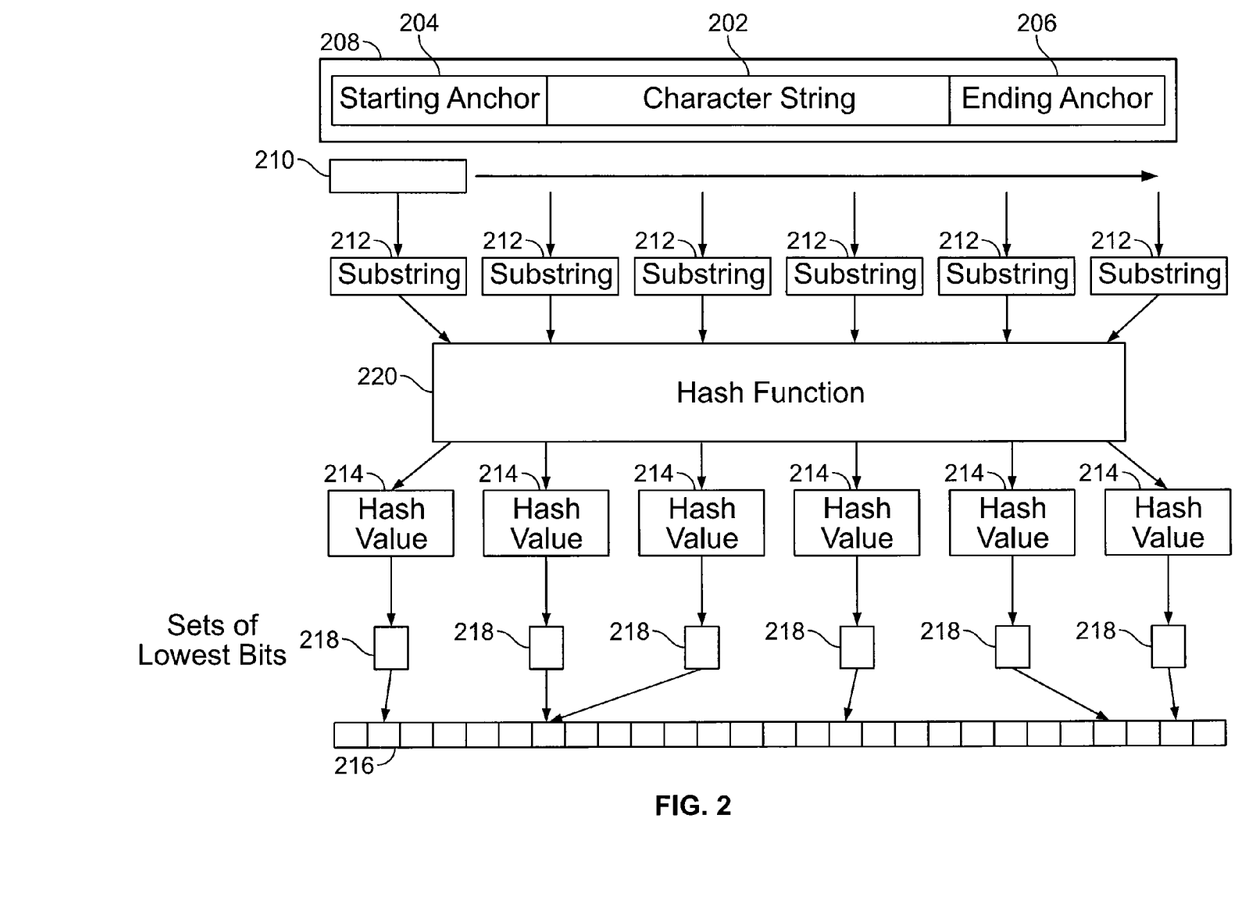
FIG. 2 is an exemplary diagram detailing how a word or character string within a dictionary dataset is simhashed.

FIG. 2 illustrates an exemplary diagram detailing how a word or character string within a dictionary dataset is simhashed to generate the aforementioned simhashed dictionary dataset. Each character string within the dictionary dataset is simhashed according to the exemplary diagram shown in FIG. 2 and the description set forth below in order to generate corresponding simhashed character strings. For any given character string, represented by character string 202 in FIG. 2, starting anchor 204 and ending anchor 206 are attached. Starting anchor 204 and ending anchor 206 may be any character and are added to character string 202 in order to indicate the beginning and the end, respectively, of a given word or character string. Starting anchor 204, character string 202, and ending anchor 206 collectively represent a composite character string 208.

A sliding window 210 of length W=2, 3, 4, . . . is applied to composite character string 208 character by character. As sliding window 210 is applied, substrings 212 are extracted from composite character string 208. For example, if composite character string 208 is represented by the word "^Denver$" and W=3, the resulting substrings 212 are represented by: ^De, Den, env, nve, ver, and er$.

Each substring 212 is hashed using a hash function 220 which maps each substring 212 to a hash value 214, each representing an integer. A set of lowest bits 218 of each hash value 214 is then extracted and mapped to bitmask 216 by setting each bit corresponding to a particular integer to '1'. The size of bitmask 216 is related to the set of lowest bits 218. If the number of bits in the set of lowest bits 218 is represented by a, then the size of the bitmask is represented by $b=2^a$. For instance, if the set of lowest bits 218 is 6 bits, then bitmask 216 has a length of 64. Bitmask 216 represents a simhash of the word represented by character string 202. More specifically, bitmask 216 is a simhashed character string of character string 202 generated by performing the steps described above.

The exemplary diagram shown in FIG. 2 and the corresponding description is also applicable to generating simhashed character strings of character strings that are not a part of a dictionary dataset.

Figure 3:
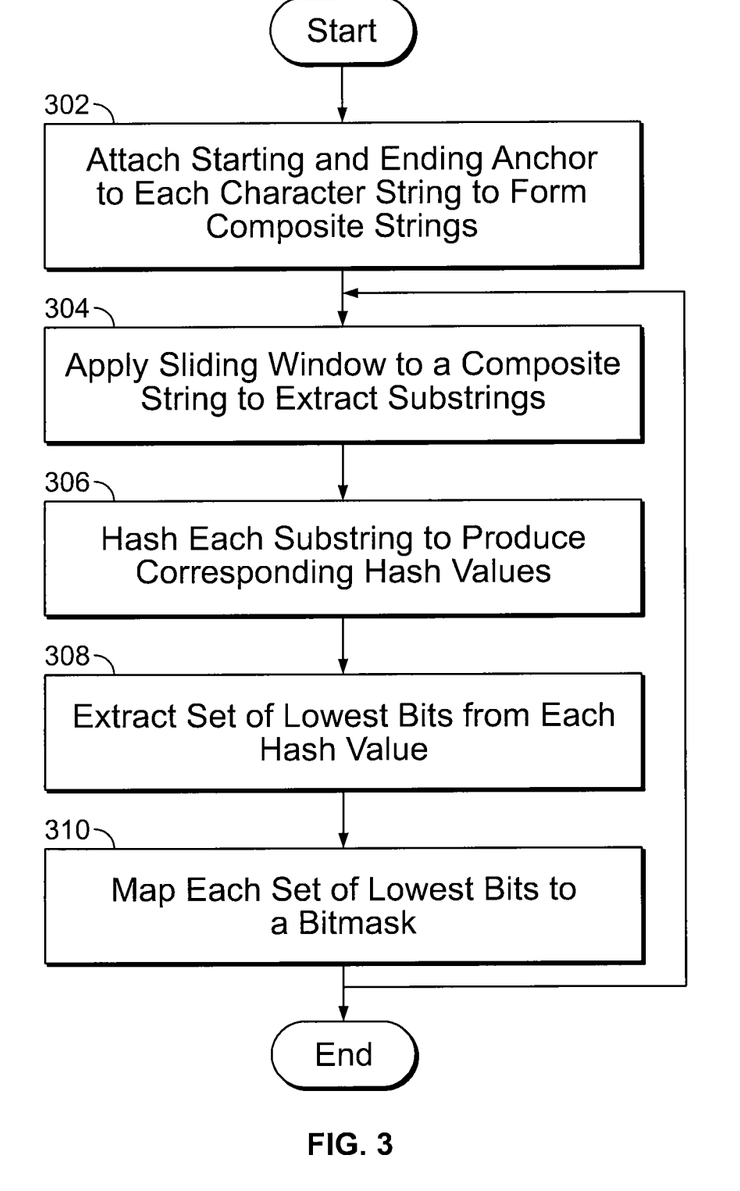
FIG. 3 is a flowchart showing the steps taken for generating a simhashed dictionary dataset to support simhash based spell correction.

FIG. 3 illustrates a flowchart showing the steps taken for generating a simhashed dictionary dataset to support simhash based spell correction. At step 302, for each character string 202 within a dictionary dataset, starting anchor 204 and ending anchor 206 are attached resulting in composite string 208. For exemplary purposes, character string 202 is represented by the word "amsterdam". For example, for the character string "amsterdam", the starting anchor may be "^" and the ending anchor character may be "$". Thus, character string "amsterdam" becomes "^amsterdam$".

At step 304, sliding window 210 of length W is applied to composite string 208 in order to extract substrings 212. W may be any number between 2 and x, where x represents the length of composite string 208. For the character string "^amsterdam$" and a sliding window size of W=3, the extraction produces the following subsets: ^am, ams, mst, step, ter, erd, rda, dam, am$.

At step 306, each of the substrings 212 are hashed, producing a corresponding hash value 214 associated with each substring 212. Any type of hash function which outputs pseudo random bits based on the input may be used to hash substrings 212. Each hash value 214 may be represented by an integer.

At step 308, a set of lowest bits 218 is extracted from each hash value 214. Each set of lowest bits represents a number that may be mapped to bitmask 216. For example, the lowest 6 bits from each hash value 214 may be extracted, each set of lowest bits representing a number between 0 and 63 of bitmask 216. For the character string "^amsterdam$" and a sliding window of W=3, nine substrings are extracted and hashed. This results in nine sets of lowest bits to map to bitmask 216, with each set of lowest bits representing a number between 0 and 63.

At step 310, each set of lowest bits 218 is mapped to bitmask 216 by setting the corresponding bit of bitmask 216 to a value of '1.' The resulting bitmask 216 represents a simhashed dictionary word or character string.

The method then returns to step 304 and repeats until all character strings in the dictionary dataset have been simhashed.

Figure 4:
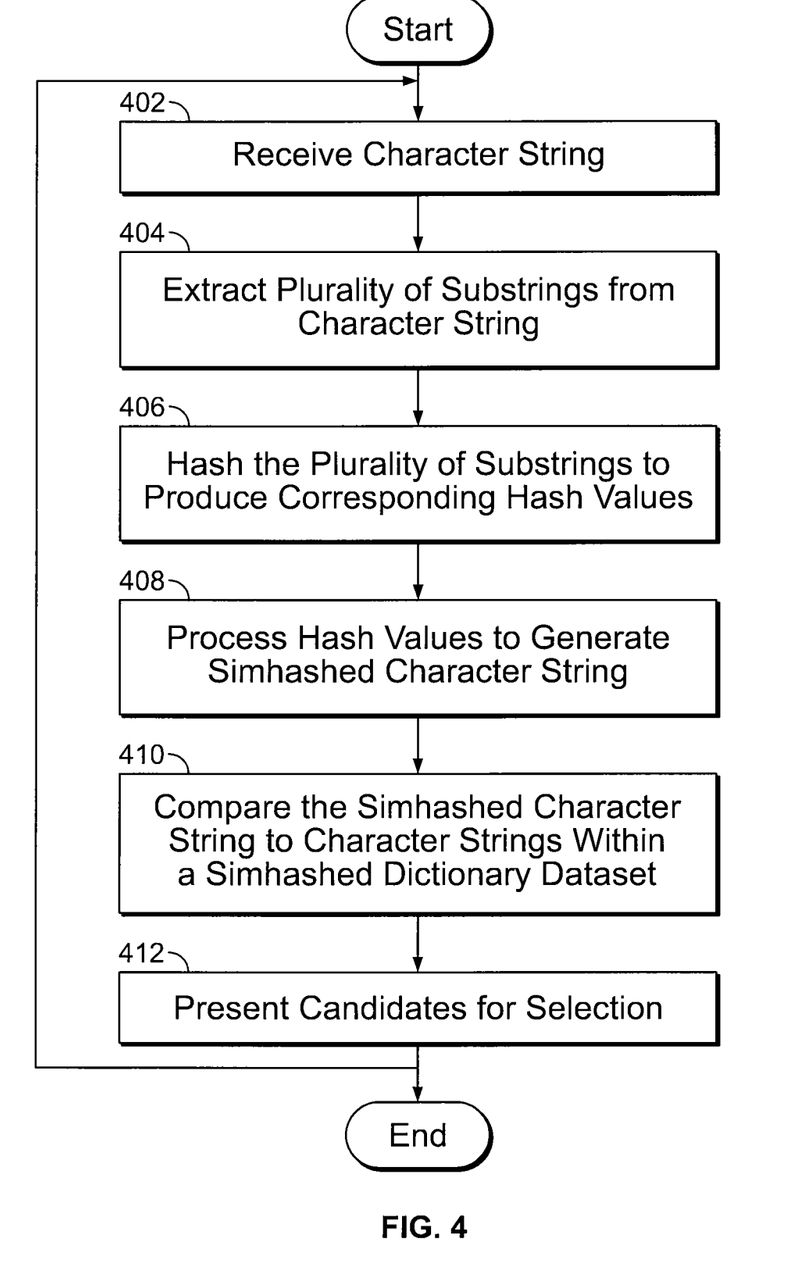
FIG. 4 is a flowchart of a process applying simhash based spell correction on a character string as the character string is input.

FIG. 4 illustrates a flowchart of a process applying simhash based spell correction on a character string as the character string is input. Input may be received from a user or from a component of the cloud environment discussed with respect to FIG. 1. At 402, at least one character of a character string is received. The characters may be received piecemeal (i.e., one by one), as a substring of a character string, or as a complete character string. In one embodiment, the characters of the character string set are received at a computer as input via a keyboard, or other user input device. In another embodiment, the characters of the character string set are received at a server through a search engine query box.

At 404, 406, and 408, a simhash is performed on the received character string to generate a simhashed character string. The process for performing simhashing entails steps similar to those discussed above with regard to simhashing words within a dictionary dataset.

More specifically, at 404, a plurality of substrings is extracted from the received character string by applying a sliding window of at least two characters to the character string. A starting anchor and an ending anchor may be appended to the character string before extracting the plurality of substrings.

At 406, the plurality of substrings is hashed to produce a plurality of corresponding hash values.

At 408, each hash value is processed to generate a bitmask representing a simhashed character string. Processing each hash value includes extracting a set of lowest bits from each hash value and mapping each set of lowest bits to the bitmask.

At 410, the simhashed character string is compared to character strings within the simhashed dictionary dataset. The comparison is performed by applying a nearest neighbor algorithm to determine which character strings within the simhashed dictionary dataset produce the lowest hamming distances when compared to the input sim hashed character string.

At 412, the character strings within the simhashed dictionary dataset producing the lowest hamming distances which satisfy a threshold are presented as candidates. These candidates represent potential spellcorrected versions of the received character string. The candidates may be displayed as a list for user selection. Each candidate satisfying the threshold may be scored and presented in the list in a ranked order. Alternatively, the candidate with the highest score may be automatically selected to replace the received character string.

If there are more characters to enter into the character string, the method may then return to step 402 and repeat steps 404 through 412 until completion of the character string and spell correction is complete.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIGS. 2 and/or 4. Certain steps of the methods described herein, including one or more of the steps of FIGS. 2 and/or 4, may be performed by a server or by another processor in a network-based cloud-computing system. Certain steps of the methods described herein, including one or more of the steps of FIGS. 2 and/or 4, may be performed by a client computer in a network-based cloud computing system. The steps of the methods described herein, including one or more of the steps of FIGS. 2 and/or 4, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 2 and/or 4, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 5:
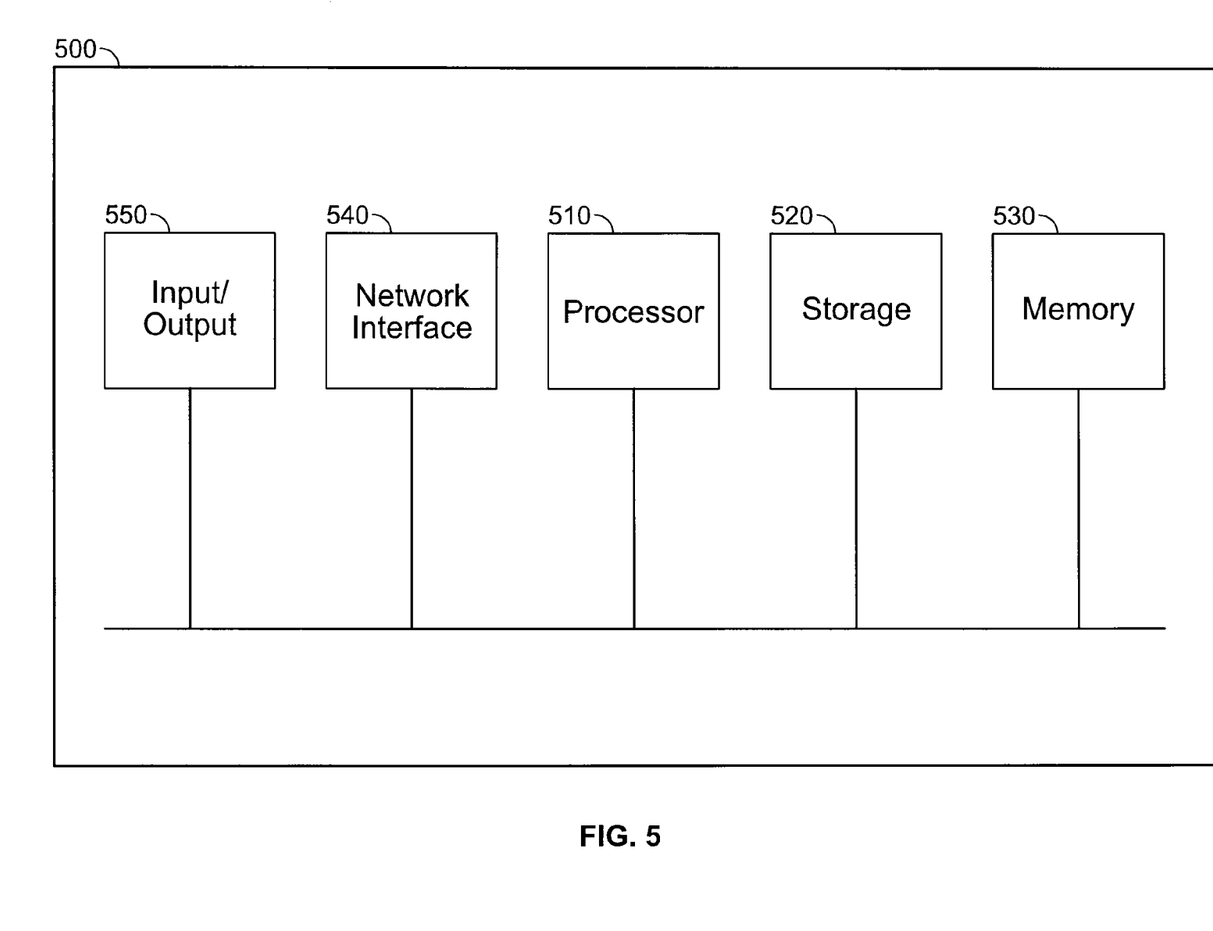
FIG. 5 is a high-level block diagram that may be used for implementing simhash based spell correction.

A high-level block diagram of an exemplary computer that may be used to implement systems, apparatus and methods described herein is illustrated in FIG. 5. Computer 500 comprises a processor 510 operatively coupled to a data storage device 520 and a memory 530. Processor 510 controls the overall operation of computer 500 by executing computer program instructions that define such operations. The computer program instructions may be stored in data storage device 520, or other computer readable medium, and loaded into memory 530 when execution of the computer program instructions is desired. Thus, the method steps of FIGS. 2 and/or 4 can be defined by the computer program instructions stored in memory 530 and/or data storage device 520 and controlled by processor 510 executing the computer program instructions. For example, the computer program instructions can be implemented as computer executable code programmed by one skilled in the art to perform an algorithm defined by the method steps of FIGS. 2 and/or 4. Accordingly, by executing the computer program instructions, the processor 510 executes an algorithm defined by the method steps of FIGS. 2 and/or 4. Computer 500 also includes one or more network interfaces 540 for communicating with other devices via a network. Computer 500 also includes one or more input/output devices 550 that enable user interaction with computer 500 (e.g., display, keyboard, mouse, speakers, buttons, etc.).

Processor 510 may include both general and special purpose microprocessors, and may be the sole processor or one of multiple processors of computer 500. Processor 510 may comprise one or more central processing units (CPUs), for example. Processor 510, data storage device 520, and/or memory 530 may include, be supplemented by, or incorporated in, one or more application-specific integrated circuits (ASICs) and/or one or more field programmable gate arrays (FPGAs).

Data storage device 520 and memory 530 each comprise a tangible non-transitory computer readable storage medium. Data storage device 520, and memory 530, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 550 may include peripherals, such as a printer, scanner, display screen, etc. For example, input/output devices 550 may include a display device such as a cathode ray tube (CRT) or liquid crystal display (LCD) monitor for displaying information to the user, a keyboard, and a pointing device such as a mouse or a trackball by which the user can provide input to computer 500.

Any or all of the systems and apparatus discussed herein, may be implemented using a computer such as computer 500.

One skilled in the art will recognize that an implementation of an actual computer or computer system may have other structures and may contain other components as well, and that FIG. 5 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

I claim:

1. A method, comprising:
   extracting a plurality of substrings from a composite character string by applying a sliding window of at least two characters to the composite character string, the composite character string comprising a starting anchor, a character string and an ending anchor;
   hashing the plurality of substrings to produce a plurality of corresponding hash values;
   processing each hash value to generate a simhashed character string, wherein processing each hash value comprises:
      extracting a set of lowest bits from each hash value; and
      mapping each set of lowest bits to a bitmask representing the simhashed character string; and
   comparing the simhashed character string with simhashed character strings within a simhashed dictionary dataset to determine at least one candidate to replace the character string.

2. The method of claim 1, wherein comparing the simhashed character string with simhashed character strings within a simhashed dictionary comprises:
   applying a nearest neighbor algorithm to search the simhashed dictionary dataset for the at least one candidate.

3. The method of claim 2, wherein applying a nearest neighbor algorithm comprises:
   determining a hamming distance between the simhashed character string and each simhashed character string within the simhashed dictionary dataset satisfying a threshold;
   scoring each simhashed character string within the simhashed dictionary dataset satisfying the threshold; and
   ranking the scored simhashed character strings.

4. The method of claim 1, further comprising:
   presenting the at least one candidate for selection to replace the character string.

5. The method of claim 1, further comprising:
automatically replacing the character string with one of the at least one candidate.

6. A system, comprising a processor configured to:
extract a plurality of substrings from a composite character string by applying a sliding window of at least two characters to the composite character string, the composite character string comprising a starting anchor, a character string and an ending anchor;
hash the plurality of substrings to produce a plurality of corresponding hash values;
process each hash value to generate a bitmask representing a simhashed character string, wherein the processor is further configured to:
extract a set of lowest bits from each hash value; and
map each set of lowest bits to a bitmask representing the simhashed character string; and
compare the simhashed character string with simhashed character strings within a simhashed dictionary dataset to determine at least one candidate to replace the character string.

7. The system of claim 6, wherein the processor is further configured to:
apply a nearest neighbor algorithm to search the simhashed dictionary dataset for the at least one candidate.

8. The system of claim 7, wherein the processor is further configured to:
determine a hamming distance between the simhashed character string and each simhashed character string within the simhashed dictionary dataset satisfying a threshold;
score each simhashed character string within the simhashed dictionary dataset satisfying the threshold; and
rank the scored simhashed character strings.

9. The system of claim 6, wherein the processor is further configured to:
present the at least one candidate for selection to replace the character string.

10. The system of claim 6, wherein the processor is further configured to:
automatically replace the character string with the at least one candidate.

11. An article of manufacture including a non-transitory computer-readable medium having instructions stored thereon, that in response to execution by a computing devices cause the computer device to perform operations comprising:
extracting a plurality of substrings from a composite character string by applying a sliding window of at least two characters to the composite character string, the composite character string comprising a starting anchor, a character string and an ending anchor;
hashing the plurality of substrings to produce a plurality of corresponding hash values;
processing each hash value to generate a bitmask representing a simhashed character string, wherein processing each hash value comprises:
extracting a set of lowest bits from each hash value; and
mapping each set of lowest bits to a bitmask representing the simhashed character string; and
comparing the simhashed character string with simhashed character strings within a simhashed dictionary dataset to determine at least one candidate to replace the character string.

12. The non-transitory computer-readable medium of claim 11, wherein comparing the simhashed character string with simhashed character strings within a simhashed dictionary comprises:
applying a nearest neighbor algorithm to search the simhashed dictionary dataset for the at least one candidate.

13. The non-transitory computer-readable medium of claim 12, wherein applying a nearest neighbor algorithm comprises:
determining a hamming distance between the simhashed character string and each simhashed character string within the simhashed dictionary dataset satisfying a threshold;
scoring each simhashed character string within the simhashed dictionary dataset satisfying the threshold; and
ranking the scored simhashed character strings.

14. The non-transitory computer-readable medium of claim 11, wherein the operations further comprise:
presenting the at least one candidate for selection to replace the character string.

15. The non-transitory computer-readable medium of claim 11, wherein the operations further comprise:
automatically replacing the character string with one of the at least one candidate.

16. A method for generating a simhashed dictionary dataset, comprising:
appending a starting anchor and an ending anchor to each character string within a dictionary dataset to form corresponding composite character strings;
extracting substrings from each composite character string by applying a sliding window of at least two characters to the composite character string;
hashing each extracted substring to produce a corresponding hash value;
extracting a set of lowest bits from each hash value; and
generating a bitmask corresponding to each character string by mapping each set of lowest bits to the bitmask.

* * * * *

UNITED STATES PATENT AND TRADEMARK OFFICE
CERTIFICATE OF CORRECTION

PATENT NO. : 8,661,341 B1
APPLICATION NO. : 13/009189
DATED : February 25, 2014
INVENTOR(S) : Luuk Van Dijk Page 1 of 1

It is certified that error appears in the above-identified patent and that said Letters Patent is hereby corrected as shown below:

IN THE CLAIMS:

At column 9, claim 5, line 2, please change "one of the" to -- the --;

At column 10, claim 15, line 36, please change "one of the" to -- the --.

Signed and Sealed this
Third Day of June, 2014

Michelle K. Lee
*Deputy Director of the United States Patent and Trademark Office*